United States Patent [19]
Cothran

[11] Patent Number: 4,474,107
[45] Date of Patent: Oct. 2, 1984

[54] FOOD OVEN AND SMOKER DEVICE

[75] Inventor: Herman Cothran, El Toro, Calif.

[73] Assignee: American International Foodservice, Lakeforest, Calif.

[21] Appl. No.: 474,794

[22] Filed: Mar. 14, 1983

[51] Int. Cl.³ .................... A47J 37/00; A23B 4/04
[52] U.S. Cl. ........................ 99/352; 99/331; 99/389; 99/400; 99/446; 99/482; 426/314
[58] Field of Search ........... 99/467, 468, 481, 482, 99/389, 331, 352, 446, 469, 470, 471, 391, 400; 426/314

[56] References Cited

U.S. PATENT DOCUMENTS

| | | | |
|---|---|---|---|
| 1,901,616 | 3/1933 | Vaughan | 99/482 |
| 3,002,444 | 10/1961 | Hoebing | 99/482 |
| 3,173,357 | 3/1965 | Nunnery | 99/481 |
| 3,397,632 | 8/1968 | Moler | 99/446 |
| 4,130,052 | 12/1973 | Jacobson | 99/482 |
| 4,232,597 | 11/1980 | Perrine | 99/482 |
| 4,355,570 | 10/1982 | Martin | 99/482 |

*Primary Examiner*—Robert W. Jenkins
*Attorney, Agent, or Firm*—Hubbard & Stetina

[57] ABSTRACT

An improved food oven and method of preparing food is disclosed characterized by a double-oven compartment structure with each compartment having multiple infrared heating rod arrays and a smoker unit adapted to prepare food disposed within the compartment. Operation of the heating rod arrays and smoker units are monitored by a novel electronic control system which permits independent baking, broiling, barbecuing, smoking and hold-warming of foods disposed within each compartment. The compartments further incorporate a unique vent system which automatically generates a convectional airflow through each of the compartments to reduce isolated temperature gradients within the compartments and effectuate a generally uniform preparation of food.

10 Claims, 5 Drawing Figures

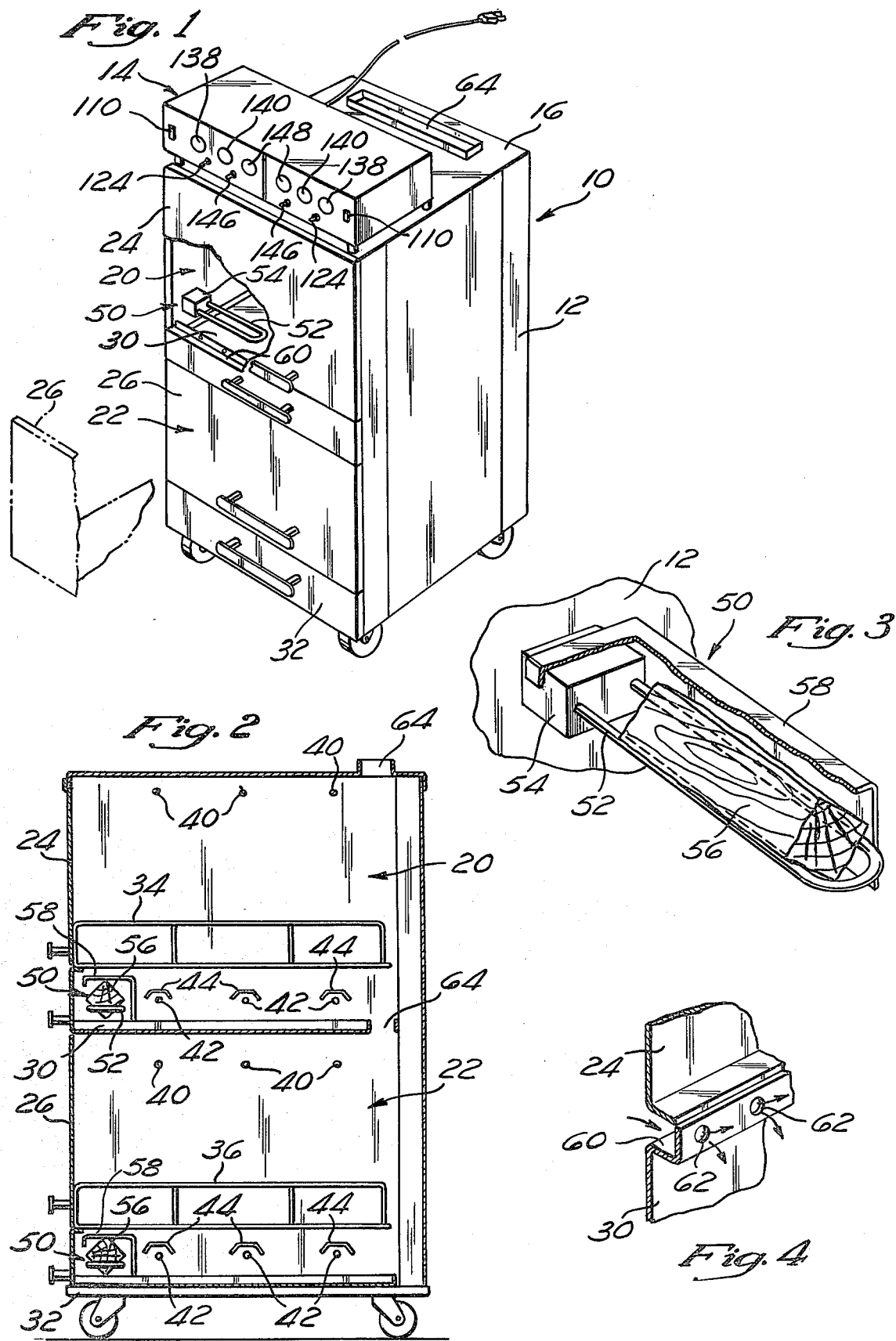

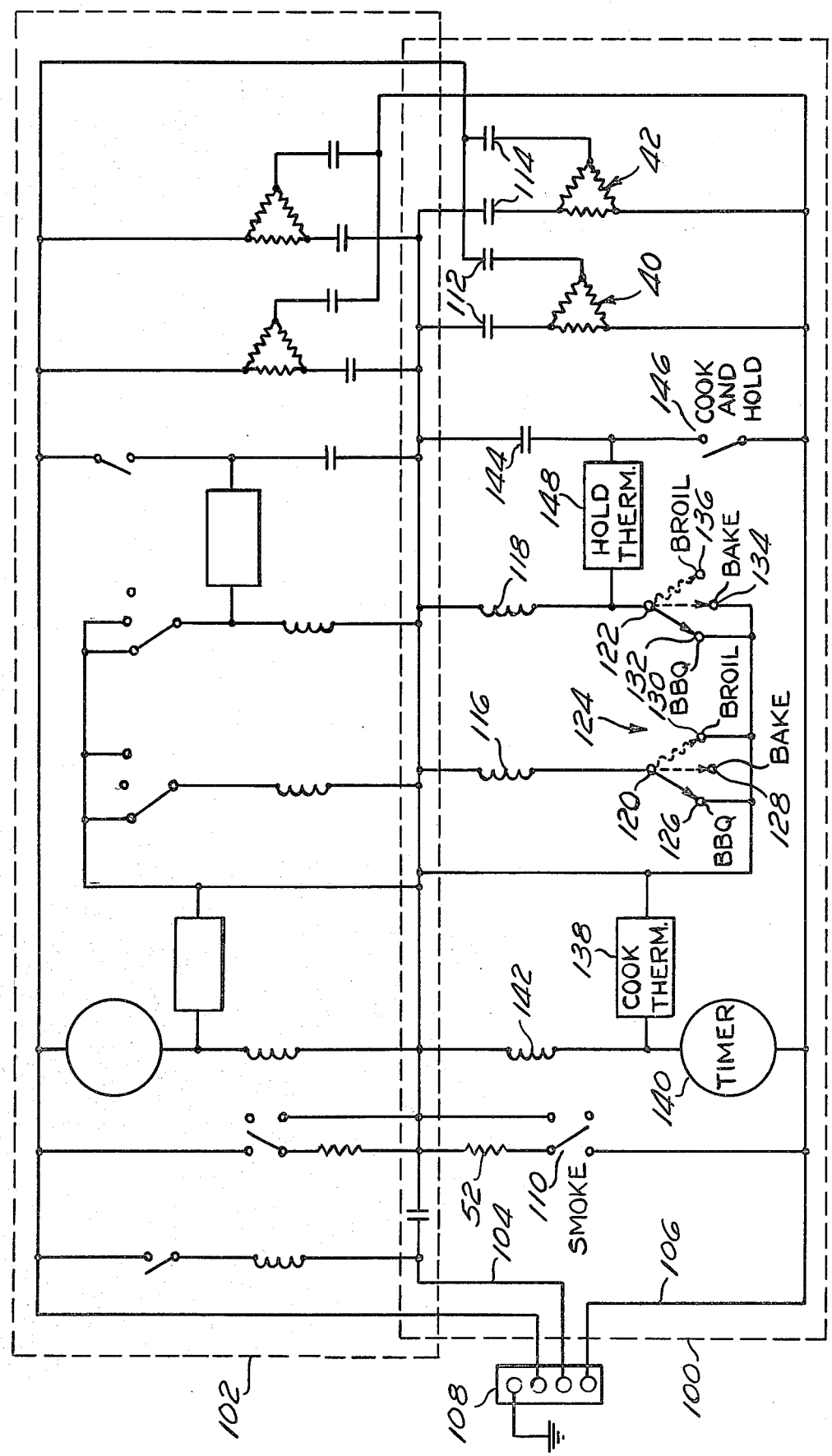

FOOD OVEN AND SMOKER DEVICE

BACKGROUND OF THE PRESENT INVENTION

The present invention relates to oven structures and, more particularly, to an improved food oven and method of preparing food characterized by a double-oven compartment structure and a novel electronic control system adapted to permit independent baking, broiling, barbecuing, smoking, and hold-warming of foods disposed within each oven compartment.

In recent years, there has been a substantial increase in the number of prepared meals being served to the general public through restaurant establishments. Due to this increase, the general public has become more diverse and sophisticated in its menu desires which has resulted in restaurant establishments having to diversify the scope and improve the quality of their menu to accommodate the average restaurant customer.

To meet this need, a variety of commercial cooking equipment has heretofore been utilized in the prior art such as grills, convection ovens, charbroilers, microwave ovens, and the like. Although all of these prior art cooking devices have proven generally effective, they all possess inherent deficiencies which have detracted from their overall effectiveness in the commercial trade.

Foremost of these deficiencies has been the inability of the majority of the prior art cooking apparatus to be utilized for differing cooking applications such as charbroiling, barbecuing, baking, and/or smoking. Thus, restaurant establishments desiring to prepare foods in such differing applications have been required to purchase separate cooking equipment for each of these independent cooking applications. The use of such multiple prior art equipment has proven cost prohibitive due to its extremely high capital cost as well as its increased space requirements within the kitchen area of the restaurant establishments.

In addition, the prior art cooking devices have typically been extremely labor intensive requiring food to be continuously observed, turned, and/or basted during preparation. In this regard, skilled chefs or food technicians have routinely been mandated to insure consistent quality in the prepared food product.

Further, due to the prior art devices typically requiring a prolonged start-up or warm-up period to obtain proper cooking temperatures, most of the prior equipment has required continuous operation throughout the entire business hours of the restaurant establishment thereby significantly increasing energy consumption and costs.

Thus, there exists a substantial need in the art for an improved food oven apparatus and method of preparing food which can be utilized to prepare various food menus at relatively low cost and insures consistent food quality without the need for skilled labor.

SUMMARY OF THE PRESENT INVENTION

The present invention specifically addresses and alleviates the above-referenced deficiencies associated in the art. More particularly, the present invention comprises an improved food oven and method of preparing food characterized by a double-oven compartment structure with each compartment having multiple infrared heating rod arrays and a smoker unit. Operation of the heating rod arrays and smoker units may be preset and monitored by an electronic control system which permits independent baking, broiling, barbecuing, hold-warming, and smoking of foods disposed within each compartment. The oven structure of the present invention further incorporates a novel vent system which automatically generates a convectional air flow through the oven compartments during operation.

Due to the double-oven compartment structure, the present invention permits economies in space utilization within the kitchen of the restaurant establishment. In addition, due to the structure of the present invention facilitating either baking, broiling, smoking, fast and slow cook, and hold-warming of food preparations disposed therein, the present invention permits diversity in menu selection for the restaurant establishment without the requirements of purchasing and utilizing multiple cooking apparatus.

Further, due to the oven structure of the present invention utilizing infrared heating rod arrays which produce high penetration heat waves, intense heat may be directed to the surface of the food products disposed within the compartments to seal the exterior and reduce food dehydration. The infrared heating rods or elements further are advantageous due to their ability to rapidly reach proper cooking temperature from start-up and subsequently sustain the proper temperature at peak efficiency.

Additionally, the novel electronic control mechanism of the present invention permits the preparation cycles of each of the dual oven compartments to be preset and continuously monitored to insure consistent quality of the prepared food. Due to these presetting and monitoring features, the present invention provides a significant improvement in the art in that the entire cooking process may be effectuated without manual monitoring and without skilled labor.

Further, the unique vent system incorporated into the structure of the present invention automatically generates a convectional air flow through each of the oven compartments to insure that food positioned at differing locations within each oven is uniformally prepared. Additionally, in the preferred embodiment, the structure of the present invention is completely portable to permit ease in installation and fully thermally insulated to reduce overall energy operating costs.

DESCRIPTION OF THE DRAWINGS

These as well as other features of the present invention will become more apparent upon reference to the drawings wherein:

FIG. 1 is a perspective view of the improved food oven apparatus of the present invention illustrating its double-oven compartment structure and electronic control system;

FIG. 2 is a cross-sectional view illustrating the inferior construction of the oven apparatus of the present invention;

FIG. 3 is an enlarged perspective view of a smoker unit utilized in the present invention;

FIG. 4 is a partial perspective view illustrating the vent structure of the present invention utilized to generate convectional air flow through the oven of the present invention; and FIG. 5 is a schematic representation of the electrical control circuit utilized in the present invention.

DETAILED DESCRIPTION OF THE PREFERRED EMBODIMENT

Referring to FIG. 1, there is shown the improved food oven apparatus 10 of the present invention composed generally of a housing 12 and electronic control unit 14 advantageously positioned for easy access upon the top surface 16 of the housing 12. In the preferred embodiment, the housing 12 is formed with a double-wall stainless steel construction having dimensions of approximately 36 by 60 by 36 inches. With the space existing between the double wall construction of the housing 12 being filled with suitable thermal insulation (not shown) to reduce heat loss from the interior of the housing 12 to the environment. Merely by way of example and not limitation, the housing 12 is preferably segregated into separate upper and lower oven compartments 20 and 22, respectively, which as will be explained in more detail infra, may be independently controlled to effectuate differing cooking applications within the apparatus 10.

As best shown in FIGS. 1 and 2, the oven compartments 20 and 22 are each provided with a front access door 24 and 26, respectively, which may be mounted for either sliding or pivotal movement outward away from the housing 12. The lower portion of each of the compartments 20 and 22 includes a slide out tray 30 and 32 which forms the lower boundaries of the oven compartments 20 and 22 and additionally serves as a pan or reservoir for grease and juices released from food disposed within the compartments 20 and 22 during the cooking process. A support grate 34 and 36 sized to carry the food product (not shown) desired to be prepared is additionally disposed within the oven compartments 20 and 22 and adapted to be slid in and out of the same.

Each of the oven compartments 20 and 22 is provided with an upper and lower heating rod or element array 40 and 42, respectively, which as best shown in FIG. 2, are disposed on opposite sides of the grates 34 and 36. In the preferred embodiment, each of the arrays are composed of a plurality of infrared stainless steel heating rods which extend transversely across the width of the compartments 20 and 22. Such infrared heating rods can be obtained from a variety of manufacturers and are advantageous due to their ability to rapidly reach high operating temperatures and subsequently sustain the operating temperature at relatively low input power requirements. Advantageously, each of the plural rods of the lowermost arrays 42 are shielded by a shroud 44 which extends throughout the length of each of the rods and prevents grease and juices released from the meat from falling directly upon the rods. Due to the orientation of the upper and lower heating rod arrays 40 and 42 in relation to the grates 34 and 36, the upper arrays 40 serve a broiling function while the lower arrays 42 serve a baking function. In addition, with both the upper and lower arrays 40 and 42 being operated concurrently, the food positioned upon the grates 34 and 36 is in effect barbecued within the oven compartment 20 and 22.

The lowermost portion of each of the compartments 20 and 22 is further provided with a smoker unit designated generally by the numeral 50. As best shown in FIG. 3, the smoker unit 50 comprises a generally U-shaped infrared heating element 52 which is rigidly mounted to the sidewall of the housing 12 by an insulator block 54. The lateral distance between the elongate members of the U-shaped heating rod 52 is preferably sized to be slightly less than the dimensions of a hickory wood block 56 such that the block 56 may be cradled within the U-shaped heating rod 52. A generally L-shaped shroud 58 is removably mounted to the insulator block 54 to prevent grease and other juices released from the food being prepared from contacting and vaporizing upon the rod 52. As will be recognized, in operation, as the generally U-shaped rod 52 reaches operating temperatures, the hickory wood block 56 slowly burns, releasing natural hickory smoke which travels through each of the compartments 22 and 24.

Referring to FIG. 4, the detail construction of the vent system of the present invention which serves to generate convectional air flow through the interior of each of the oven compartments 20 and 22 is described. As shown, the uppermost edge of each of the grease trays 30 and 32 includes a generally L-shaped flange 60 which extends inwardly within the interior of the compartments 20 and 22. A plurality of apertures 62 are formed to extend through the flange 60 and are preferably equidistantly spaced along its length. The apertures 62 are continuously exposed to the environment due to the lowermost edge of the front access doors 24 and 26 being positioned vertically above the flange 60 and thus, air from the environment is free to travel into the interior of the compartment 20. The upper portions of the compartments 20 and 22 each include a elongate opening or vent 64 which is preferably positioned at the rear of the housing 12 so as to be spaced as far as possible from the apertures 62. In operation, when the heating rod arrays 40 or 42 are energized, the increase in air temperature effectuated within the compartments 20 and 22 will cause a chimney effect, wherein convectional air flow will be automatically generated between the apertures 62 and vents 64. The magnitude of this convectional air flow is of course determined by the amount of heating within the oven compartments 20 and 22 as well as the size of the apertures 62 and vents 64. The applicant has found that due to this self-generated convectional air flow, isolated temperature gradients within different areas of the compartments 20 and 22 are held to a minimum thereby insuring more consistent preparation of food disposed within the compartments 20 and 22.

The operation of the heating arrays 40 and 42 and smoker units 50 within each of the compartments 20 and 22 is monitored or controlled by an electronic control system 14 which provides independent baking, broiling, barbecuing, smoking and/or hold-warming of food within each of the oven compartments 20 and 22. In FIG. 5, a simplified schematic diagram of the circuitry of the control system 14 is illustrated. As will be recognized, the circuit is composed of two branches 100 and 102 (indicated by phantom lines) which serve to control the operation of the upper and lower oven compartments 20 and 22, respectively. Due to both of these circuit branches being identical, the components and operation of only one circuit branch 100 will be described, it being understood that the other circuit branch 102 is identical.

The circuit 100 includes a pair of power leads 104 and 106 which are connected to a standard source of 220-volt triple phase AC current by way of a three pole four wire connector 108. The heating coil 52 of the smoker unit 50 is connected in series with a switch 110 and applied across the leads 104 and 106. In the preferred embodiment, the switch 110 comprises a push button switch which provides an illuminated light indication of the operation of the smoker unit 50. As will be recognized, due to the heating coil 52 of the smoker unit 50 being controlled solely by the switch 110, the smoker unit 50 may be operated independently of the heating arrays 40 and 42.

The upper and lower heating arrays 40 and 42 are each connected in series with a respective relay 112 and 114, respectively, and disposed across the leads 104 and 106. The coils 116 and 118 of the relays 112 and 114, respectively, are each connected in series between the lead 104 and a respective contact 120 and 122 of a double pole triple throw manual switch 124. The contacts 126, 130, 132, and 134 of the switch 124 are connected to the lead 106 through a thermostat 138 and timer 140 while the contacts 128 and 136 of the switch 124 are not connected to the lead 106. The timer 140 is connected in series to the coil 142 of a relay 144. The relay 144 is connected in series with a single pole double throw switch 146 which bridges between the leads 104 and 106. The switch 106 is controlled by a thermostat 148 connected between the switch 146 and coil 118 of the relay 112. As such, it will be recognized that the relay 114 may be actuated into a closed position to operate the lower heater array 42 either by actuation of a double pole triple throw switch 122 and through the thermostat 138 and timer 140 to energized the coil 118 or alternatively, through the single pole double throw switch 146 through the thermostat 148 to energize its coil 118. As shown in FIG. 1, the switches 110, 124 and 146, timer 140 and thermostat dial 138 and 148 components are mounted upon the front panel of the control system 14 housing for easy access with the components being spacially segregated for each of the oven compartments 20 and 22.

With the oven structure and control circuitry defined, the operation of the apparatus 10 and method of preparing food of the present invention may be described. Initially, the food product (not shown) desired to be prepared, is inserted upon one or both of the grates 34 and 36 disposed within the oven compartments 20 and 22 and the access doors 24 and 26 are positioned in their closed orientation as indicated in FIG. 1. Subsequently, the desired food preparation process for each of the compartments 20 and 22 is selected and the electronic control system 14 must be preset for the desired application. Although the particular preparation process in each of the oven compartments 20 and 22 may be selected and set independently by the controller 14, for purposes of illustration, only the operation of the upper oven compartment 20 will be described.

In those instances where only a cold smoking of foods disposed within the compartment 20 is desired, a user merely depress the push button switch 110 located on the front panel of the electronic control system 14 causing the switch 110 to close wherein current flows across the U-shaped heater element 52 disposed within the oven compartment 20. As the heating element 52 rapidly elevates in temperature, the hickory wood block 56 cradled upon the heating rod 52 begins to burn and releases hickory smoke throughout the interior of the oven compartment 20. When it is desired to discontinue the operation of the smoking unit 50, the user merely depresses the push button switch 110 causing the switch to move to its open configuration indicated in FIG. 5 and terminating current flow through the heater element 52. As will be recognized, due to the heating rod of the smoker unit 50 being activated independent of the remaining heating arrays 40 and 42, the smoker unit 50 may be utilized for cold smoking applications or alternatively during cooking applications.

When it is desired to cook the food within the oven compartment 20, the user may select between a barbecuing, baking, or broiling operational modes by positioning the double pole triple throw switch 124 into one of its three operative positions. In the barbecuing mode, the switch 124 is positioned to connect the contacts 120 and 122 with the contacts 126 and 132, respectively (as understood by the solid line positions in FIG. 5). The desired cooking temperature is then set upon the cook thermostat 138 and the cooking period may be set on the timer 140. Upon activation of the timer 140, current flows through the coil 142 of the relay 144 driving the relay 144 from its normally closed position to a normally open position. In addition, current flows through the double pole triple throw switch 124 and through the coils 116 and 118 of the relays 112 and 114, respectively, to drive the relays 112 and 114 to a closed position. Upon closing of the relays 112 and 114, both heating arrays 40 and 42 are energized causing a rapid heating of the oven compartment 20. The heating of the compartment 20 will continue until such time as the temperature within the oven compartment 20 reaches the preset temperature of the cook thermostat 138 whereupon the thermostat 138 cycles to intermittently terminate current flow through the double pole triple throw switch 124 and de-energize the coils 116 and 118 to open the relays 112 and 114 or alternatively, when the timer 140 opens due to expiration of the cooking period.

When it is desired to bake the food products disposed within the oven compartment 20, the double pole triple throw switch 124 must be manually indexed to its bake position wherein the contacts 120 and 122 of the switch 124 are connected to the contacts 128 and 134 respectively (as indicated by the phantom lines in FIG. 5). In this bake position, it will be recognized that current flow through the double pole triple throw switch 124 is permitted only through the contacts 134 and 122 such that current flow through the cook thermostat 138 and timer 140 is facilitated only through the coil 118 of the relay 114 and not through the coil 116 of the relay 112. As such, only the lower array 142 is activated to heat the oven compartment 20. As in the barbecue mode, the operation of the lower heating rod array 42 will continue during cycling of the cook thermostat 138 or the timer 140 opens.

When it is desired to broil food positioned in the oven compartment 20, the double pole triple throw switch 124 must be indexed to its broil position wherein the contacts 120 and 122 are connected to the contacts 130 and 136 (as indicated by the curved phantom lines in FIG. 5). In this position, it will be recognized that current flow is permitted through the switch 124 only through the contacts 120 and 130 such that only the coil 116 of the relay 112 is activated while the coil 118 the relay 114 is deactivated. As such, only the upper heating rod array 40 is energized to effectuate a heating of the oven compartment 20. Similarly, this heating of the oven compartment 20 will be maintained during cycling of the cook thermostat 138 and subsequently discontinued upon opening of the timer 140.

In addition to the independent smoking, barbecuing, baking, and broiling cycles, the present invention permits the temperature within the oven compartment to be maintained at a warming or holding temperature after the desired cooking operation has been completed.

This hold-warming feature is made possible by activation of the single pole double throw switch 146 which in relation to the previous bake, barbecuing, and broiling description above, has been positioned in its open orientation indicated in FIG. 5. When it is desired to hold or maintain the temperature of the oven compartment 20, a user need only set the desired holding or warming temperature upon the holding thermostat 148 and manually activate the switch 146 into a closed position. The previously described barbecuing, baking, or broiling operation may then be effectuated by way of the timer 140 and thermostat 138. However, upon opening of the timer 140, the relay 144 returns to its normally closed position wherein current flow through the relay 140, hold thermostat 148 and switch 146 is effectuated. Due to the thermostat 148 being connected to the coil 118 of the relay 114, the thermostat 148 subsequently controls the operation of the relay 114 to cycle the operation of the lower heating array 42 to maintain the preset temperature indicated on the hold thermostat 148. As such, once the food preparation has been prepared, it can be maintained at any desired warming or holding temperature until removed from the oven compartment 20 for serving.

As will be recognized, throughout the barbecuing, baking, broiling, and hold-warming process, convectional air flow is generated within the interior of the oven compartment 20 by a chimney effect wherein air flow is initially drawn inward through the apertures 62, subsequently travels through the oven compartment 20 and finally exhausted through the vent opening 64. As such, temperature gradients at localized areas within the compartment 20 are minimized to insure that a consistent cooking operation is yielded.

Thus in summary, the present invention comprises a significant improvement in the art by permitting a single apparatus to prepare foods by smoking, barbecuing, baking, broiling, and hold-warming. In addition, due to the novel control circuitry of the present invention and convectional air flow through the oven compartments, consistent quality food preparation may be effectuated without the need for skilled labor. Although in the preferred embodiment certain material, component sizes, and component configurations have been disclosed, those skilled in the art will recognize that modifications can be readily made to the same without departing from the spirit of the present invention and such modifications are clearly contemplated herein.

What is claimed is:
1. An improved food oven comprising:
   a housing having at least one oven compartment defined therein;
   a support member positionable within said oven compartment adapted to carry food desired to be prepared within said compartment;
   first heating means disposed within said compartment and positioned on one side of said support member for heating said compartment;
   second heating means disposed within said compartment and positioned on the other side of said support member for heating said compartment;
   means positioned within said enclosure for generating smoke within said enclosure; and
   means for independently controlling the operation of said first and second heating means and said smoke generating means to permit the desired food carried by said support member to be selectively baked, barbecued, broiled, and smoked within said compartment.
2. The food oven of claim 1 wherein said controlling means further comprises:
   means for activating and deactivating said smoker unit.
3. The food oven of claim 2 wherein said controlling means further comprises:
   means for separately activating and deactivating said first and second heating means.
4. The food oven of claim 2 wherein said controlling means further comprises means for simultaneously activating and deactivating said first and second heating means.
5. The food oven of claim 1 further comprising means for monitoring the operation of said second heating means to permit desired food carried by said support member to be maintained at a holding temperature within said compartment.
6. The food oven of claim 5 further comprising vent means formed in said housing for generating a convectional air flow through said compartment.
7. The food oven of claim 6 wherein said first and second heating means each comprise an array of infrared heating elements.
8. The food oven of claim 7 wherein said smoke generating means comprises:
   a heating element mounted within said enclosure;
   a hickory block sized to be carried upon said heating element; and
   a shroud adapted to cover said heating element and said hickory block.
9. The food oven of claim 8 wherein said housing is formed of a stainless steel material.
10. The food oven of claim 1 wherein said housing is formed of a stainless steel material.

* * * * *